United States Patent [19]
Drews

[11] Patent Number: 5,867,734
[45] Date of Patent: Feb. 2, 1999

[54] MULTIPLE-READER MULTIPLE-WRITER QUEUE FOR A COMPUTER SYSTEM

[75] Inventor: Paul Drews, Hillsboro, Oreg.

[73] Assignee: Intel Corporation, Santa Clara, Calif.

[21] Appl. No.: 889,837

[22] Filed: Jul. 8, 1997

Related U.S. Application Data

[63] Continuation of Ser. No. 635,571, Apr. 22, 1996, abandoned, which is a continuation of Ser. No. 343,091, Nov. 21, 1994, abandoned.

[51] Int. Cl.[6] ........................................... G06F 3/00
[52] U.S. Cl. ..................... 395/872; 395/873; 395/874; 395/875; 395/876; 395/877; 711/155
[58] Field of Search .................... 395/872–877; 711/155

[56] References Cited

U.S. PATENT DOCUMENTS

| | | | |
|---|---|---|---|
| 4,914,570 | 4/1990 | Peacock | 395/650 |
| 4,916,658 | 4/1990 | Lee et al. | 395/425 |
| 5,003,471 | 3/1991 | Gibson | 395/250 |
| 5,093,912 | 3/1992 | Dong et al. | 395/650 |
| 5,125,083 | 6/1992 | Fite et al. | 395/375 |
| 5,155,820 | 10/1992 | Gibson | 395/375 |
| 5,175,829 | 12/1992 | Stumpf et al. | 395/375 |

OTHER PUBLICATIONS

Giao N. Pham et al., "A High Throughput, Asynchronous, Dual Port FIFO Memory Implemented in ASIC Technology," 1989, pp. P3–1.1 to P3–1.4.

Ahmed E. Barbour et al., "A Parallel, High Speed Circular Queue Structure," 1990, pp. 1089–1092.

*Primary Examiner*—Alyssa H. Bowler
*Assistant Examiner*—John Follansbee
*Attorney, Agent, or Firm*—Blakely, Sokoloff, Taylor & Zafman LLP

[57] ABSTRACT

The circular queue invention herein provides a mechanism and method for producers of fixed-size data items to deliver those items to consumers even under circumstances in which multiple producers and multiple consumers share the same queue. Any producer or consumer can be permitted to preempt any producer or consumer at any time without interfering with the correctness of the queue.

16 Claims, 6 Drawing Sheets

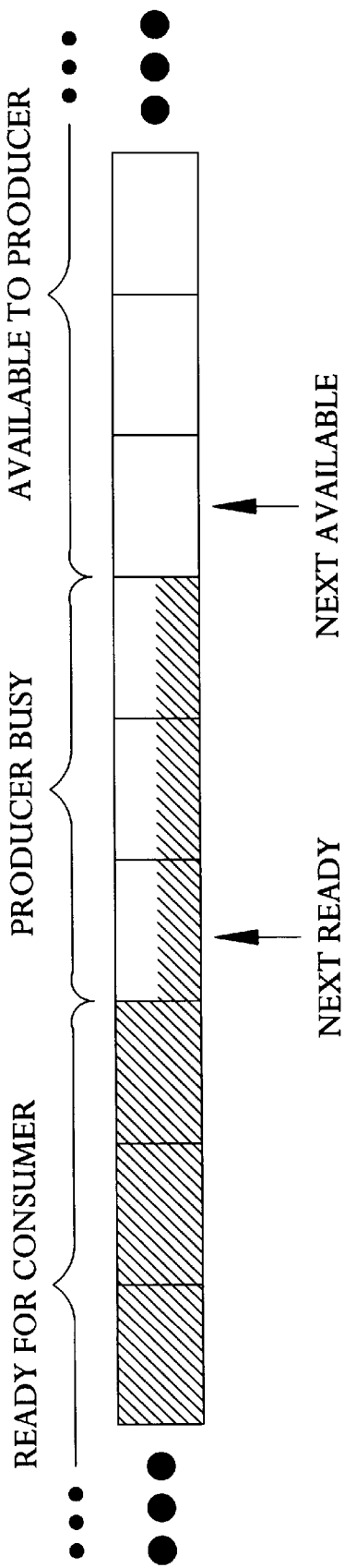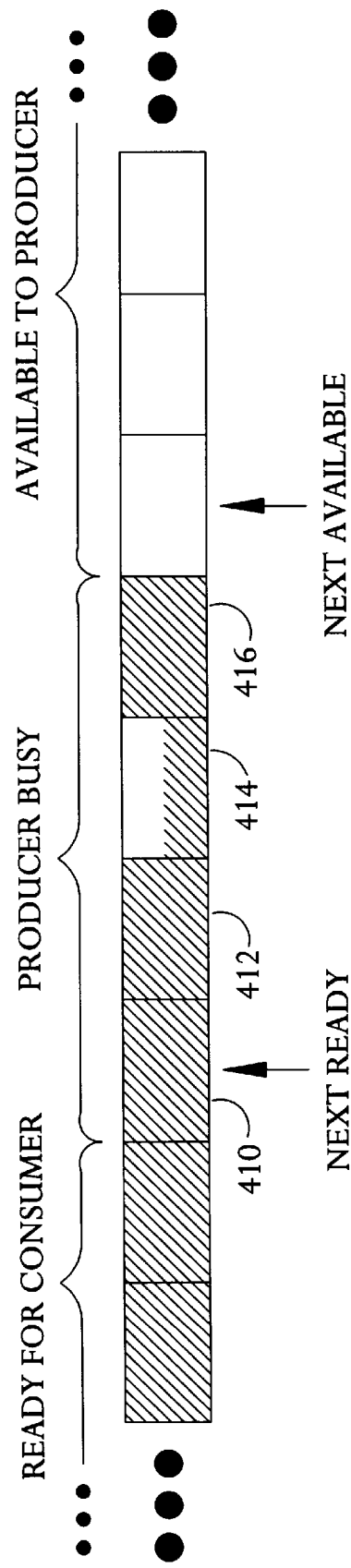

MULTIPLE-READER MULTIPLE-WRITER QUEUE FOR A COMPUTER SYSTEM

This is a Continuation Application of application Ser. No. 08/635,571, filed Apr. 22, 1996, now abandoned, which is a Continuation of application Ser. No. 08/343,091 filed Nov. 21, 1994, now abandoned.

FIELD OF THE INVENTION

The field of the invention relates to queuing systems in a computer system. Specifically, the present invention relates to multiple-reader multiple-writer queues.

DESCRIPTION OF RELATED ART

The circular queue invention herein provides a mechanism and method for producers of fixed-size data items to deliver those items to consumers even under circumstances in which multiple producers and multiple consumers share the same queue. Any producer or consumer can be permitted to preempt any producer or consumer at any time without interfering with the correctness of the queue.

Current queue implementations suffer from one or more disadvantages that stem from the need to maintain consistency of the queue data structures in spite of the fact that multiple agents manipulate them:

1. Queue implementations based on linked lists invariably involve a "critical region" within which several links must be manipulated indivisibly with respect to one another.
2. Queue implementations based on simple circular buffers avoid these critical regions by limiting themselves to a single variable being manipulated exclusively by either a reader or a writer, not both, but as a result they become limited to a single producer and a single consumer.
3. Avoiding the limitations of (1) and (2) usually involves preventing other agents such as interrupt handlers or preemptively scheduled processes from preempting an agent while it is in a critical region. On most prior art processors, instructions used to enforce critical regions require an additional privilege level not usually available to user code.
4. Avoiding the privilege limitation of (3) involves a performance burden in the form of either a procedure call to an operating system function that enforces critical regions or fault-handling code that "traps" some privileged instructions and simulates them.
5. In some cases it is possible to use a "spin-lock" implementation of critical regions without special privilege or performance overhead by appropriate use of a (non-privileged) "indivisible test-and-set" instruction. The use of a "spin-lock" is well known in the art. However, these cases are limited to ones in which the competing agents are independently scheduled, e.g., running on different processors or in a preemptively scheduled multitasking environment.

Thus, a queue supporting multiple producers and multiple consumers is needed.

SUMMARY OF THE INVENTION

The circular queue invention herein provides a mechanism and method for producers of fixed-size data items to deliver those items to consumers even under circumstances in which multiple producers and multiple consumers share the same queue. Any producer or consumer can be permitted to preempt any producer or consumer at any time without interfering with the correctness of the queue.

The present invention disclosed herein avoids the limitations of the prior art. The invention supports multiple readers and multiple writers. Any reader can preempt any other reader or writer. Any writer can preempt any other writer or reader. The implementation uses a combination of indivisible test-and-set and indivisible exchange-add instructions to enforce consistency. With the indivisible exchange-add and indivisible test-and-set instructions available on most conventional processors, no privileged instructions are required, so there is no performance penalty due to operating system overhead. There are no "critical sections" outside of the inherent indivisibility of the "indivisible"instructions, so even in cases where a task running on a single processor is preempted by an interrupt handler that must manipulate the queue before it returns control, both preempted and preempting queue operations succeed and the queue integrity is preserved. Indivisibility is typically implemented at the memory bus arbitration level, so this invention is applicable to concurrent, multiple-processor, shared-memory systems as well as preemptive, single-processor systems.

BRIEF DESCRIPTION OF THE DRAWINGS

FIGS. 2–4 illustrate queue fragments showing the position of the markers and contents of the slots.

DETAILED DESCRIPTION OF THE PREFERRED EMBODIMENT

The circular queue invention herein provides a mechanism and method for producers of fixed-size data items to deliver those items to consumers even under circumstances in which multiple producers and multiple consumers share the same queue. Any producer or consumer can be permitted to preempt any producer or consumer at any time without interfering with the correctness of the queue.

This queue implementation achieves high performance using a variation on a circular-buffer queue process that operates completely in "user" privilege, thus avoiding the overhead of procedure calls to an operating system. The data structures and the process used to manipulate them while maintaining consistency are described in the paragraphs below. The key parts of the invention are indicated in the disclosure to follow as they are presented.

Figure 1:
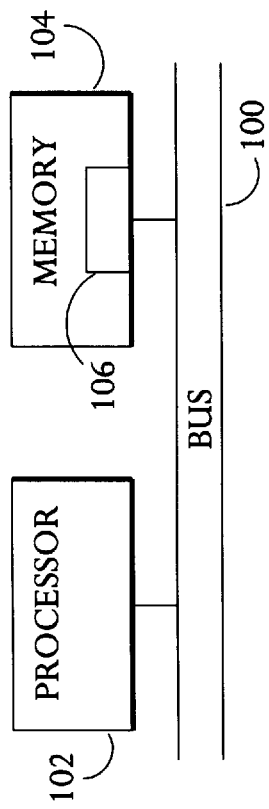
FIG. 1 illustrates a basic computer system in which the present invention operates.

Referring now to FIG. 1, a basic computer system in which the present invention operates is shown. The system comprises a bus 100 for communicating information, data, and instructions between a processor 102 and a memory subsystem 104. The processor 102 fetches instructions and data from memory 104 across bus 100, executes the instructions and typically stores resulting data back into memory 104. The basic system illustrated in FIG. 1 is well known in the art. The preferred embodiment of the present invention comprises instructions and data 106 stored in memory 104 and executed and manipulated by processor 102.

Figure 2:
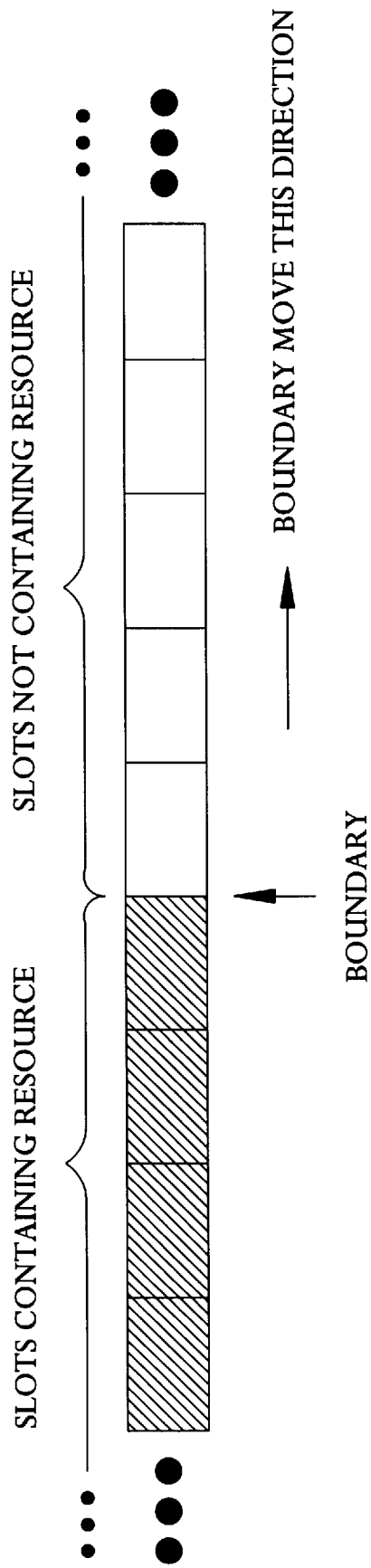

Referring now to FIGS. 2–4, fragments of the circular queue of the present invention are illustrated.

Manipulating a circular-buffer queue is a matter of adding a resource into a slot in the queue and moving a marker that indicates the boundary between the parts of the queue where resources are present and where they are not. The slots and markers are shown by example in FIG. 2. The matter of adding a resource can be applied both for "writing" and "reading" a queue. In the case of "writing", the resource added is a data item. In the case of "reading", the "resource" that is "added" is a slot that has been emptied of a data item and is therefore newly available for writing. As a result, the processes for reading and writing are the same. Readers and writers simply give different names to resources and the same process they apply to those resources. Thus, the disclosure herein describes the process for reading from and writing to the queue in terms of a relationship between producer and consumer roles. The term "producer" can then denote "writer" while the term "consumer"denotes "reader" or vice versa depending on which half of the invention is being considered. A view of a producer of the present invention adding resources to the queue and moving a boundary marker is shown in the fragment of a queue illustrated in FIG. 2.

Referring to FIG. 2, the producer places resources (cross-hatches) into slots (rectangles) and advances the marker that indicates the boundary between the contiguous slots that do not contain the resource and those that do contain the resource. Once the marker has been moved, the resource becomes available to the consumer.

The first key to the present invention is splitting the addition of a resource into three phases: (1) acquiring a slot for a resource, (2) placing the resource in the slot, and (3) making the slot with the resource available to the consumer. Conventional circular queues use a single marker to indicate a boundary between slots not containing a resource and slots that do contain a resource. In contrast, this invention replaces the single boundary marker with two markers that divide the slots near the boundary into three sets. A "next-available" marker indicates the next slot available to the producer 302 (but not yet acquired). A "next-ready" marker indicates the next slot to be made available to the consumer 300 (but not yet made ready). Slots between these markers are "producer-busy" slots where producers 302 are in the process of placing resources. This arrangement is shown in FIG. 3, in which producer-busy slots are shown partially cross-hatched. The two markers comprising the boundary are advanced in different phases as will be shown.

The processes of the present invention also maintain a count of the number of slots that are available to the producer. This is another key element of the invention. Conventional circular queues use a boundary marker not only to indicate the next slot available to the producer, but also as part of the indication of how many slots are available. In the present invention, these two functions are split between the "next-available" (to producer) marker and the "count" (of slots available to the producer). Producers examine the count to determine whether consumers have made one or more slots available. Thus the "count" (of slots available to the producer) communicates information from consumer to producer. Producers examine the "next-available" marker to acquire distinct slots in which to place resources.

Figure 5:
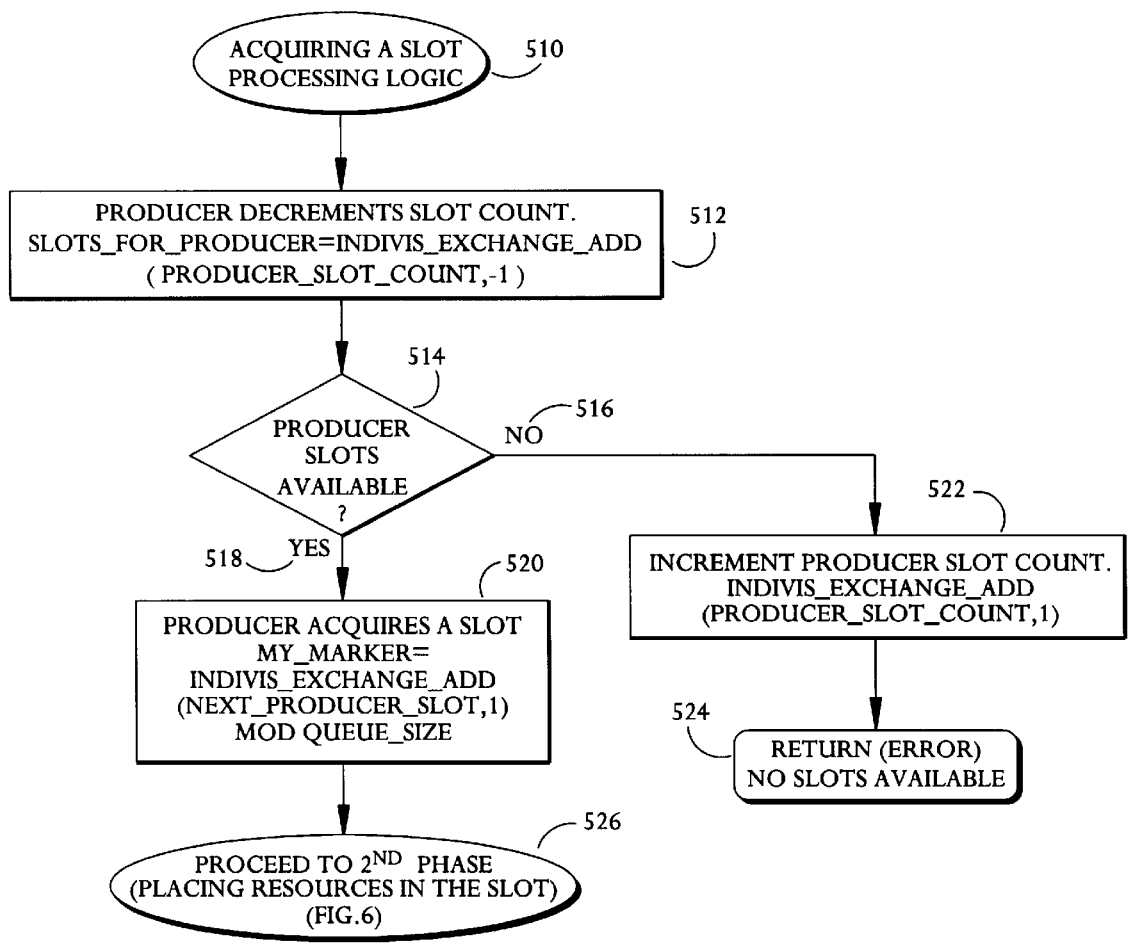
FIGS. 5–9 are flowcharts illustrating the processing logic of the present invention.

Referring now to FIG. 5, the processing logic for the first phase of the present invention for acquiring a slot (block 510) is illustrated. The indivisible exchange-add instruction is an essential part of the first phase (acquiring a slot). This instruction is used both to indivisibly decrement the count of available slots and to indivisibly increment the "next available slot" marker. In both of these cases, the instruction returns the old count or slot marker value as a side-effect. An indivisible exchange-add instruction and an indivisible test and set instruction is available in most conventional processor instruction repertoires. One example of a well known processor having such indivisible instructions is the 80486 brand microprocessor developed by Intel Corporation. The indivisibility of the instruction guarantees that no preempting agent can intercept and mistakenly use the same count or slot marker value. A producer indivisibly decrements the count (block 512) and examines the old value to determine if some slot is available (block 514). If not, it indivisibly increments the count again (block 522) and returns an error to the caller indicating that there was no room in the queue in which to place a resource (block 524). In this case the processing logic is completed. Otherwise, having determined that a slot is available (block 514), a producer indivisibly increments the next-available marker and examines the old value to acquire a distinct slot (block 520). The processing logic proceeds (block 526) to the next phase.

Figure 6:
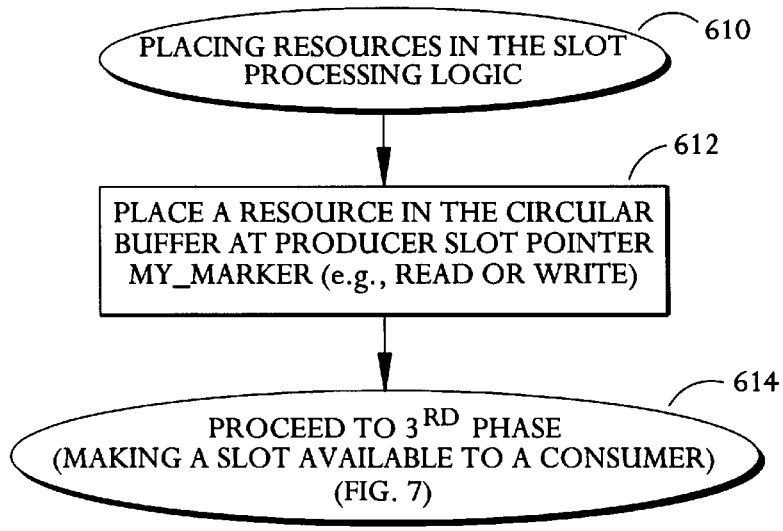

Referring now to FIG. 6, the processing logic for placing resources into queue slots (block 610) is illustrated. The second phase of the processing preferred by the present invention is placing the resource in the circular-buffer slot at the index indicated by the marker. If the producer is a "writer" it copies data from the caller's buffer into the circular buffer slot. If the producer is a "reader", it "produces" a newly emptied slot by copying data from the circular buffer slot to the caller's buffer (block 612). The processing logic proceeds (block 614) to the next phase.

Figure 9:
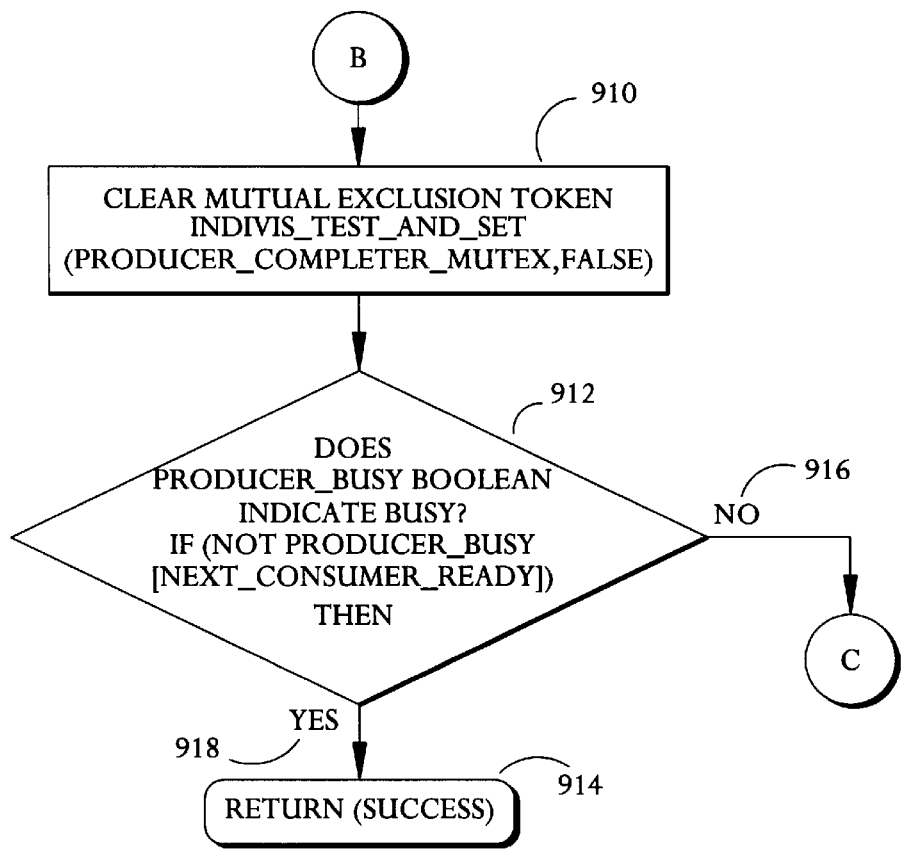
Figure 7:
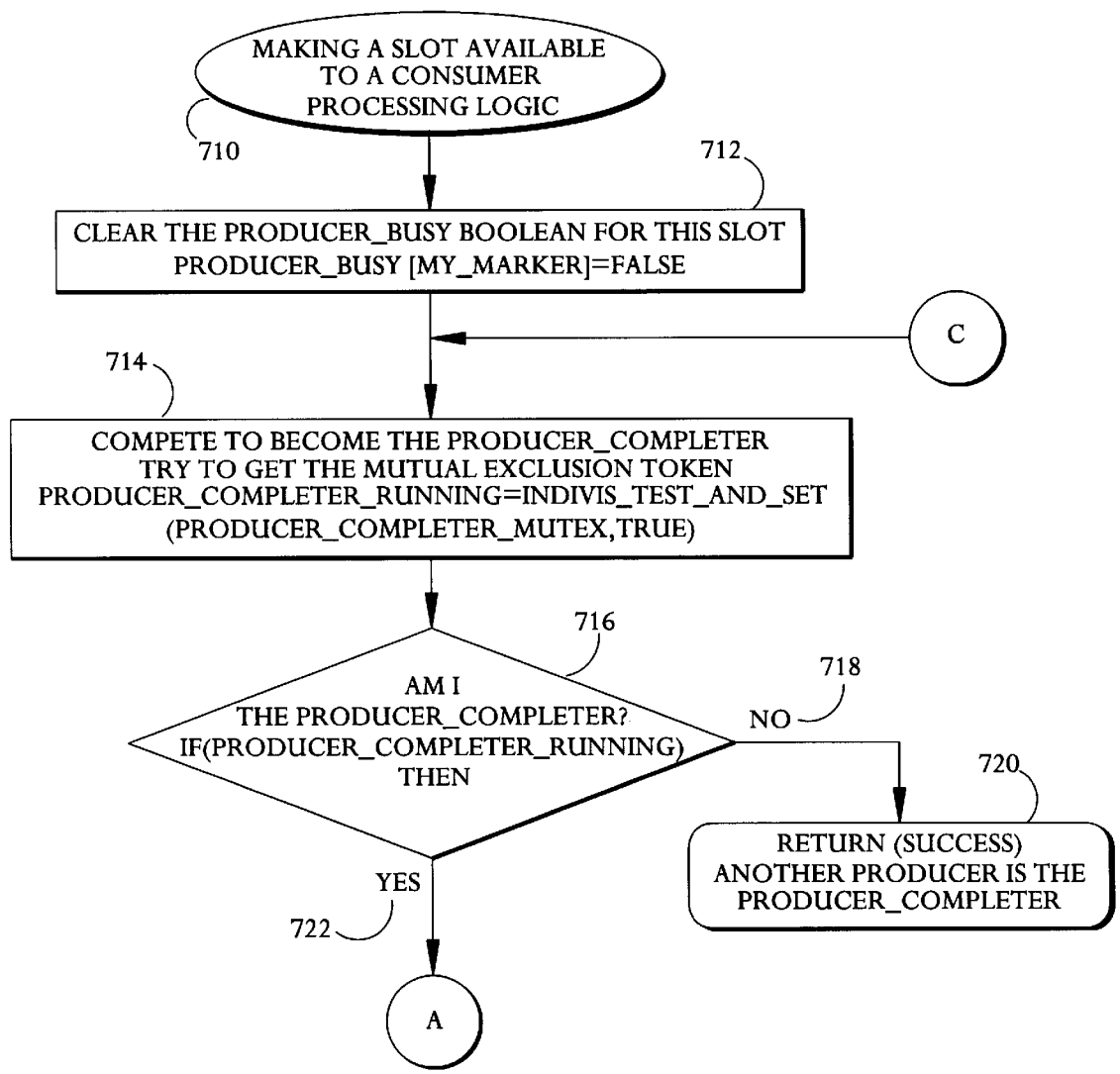
Figure 8:
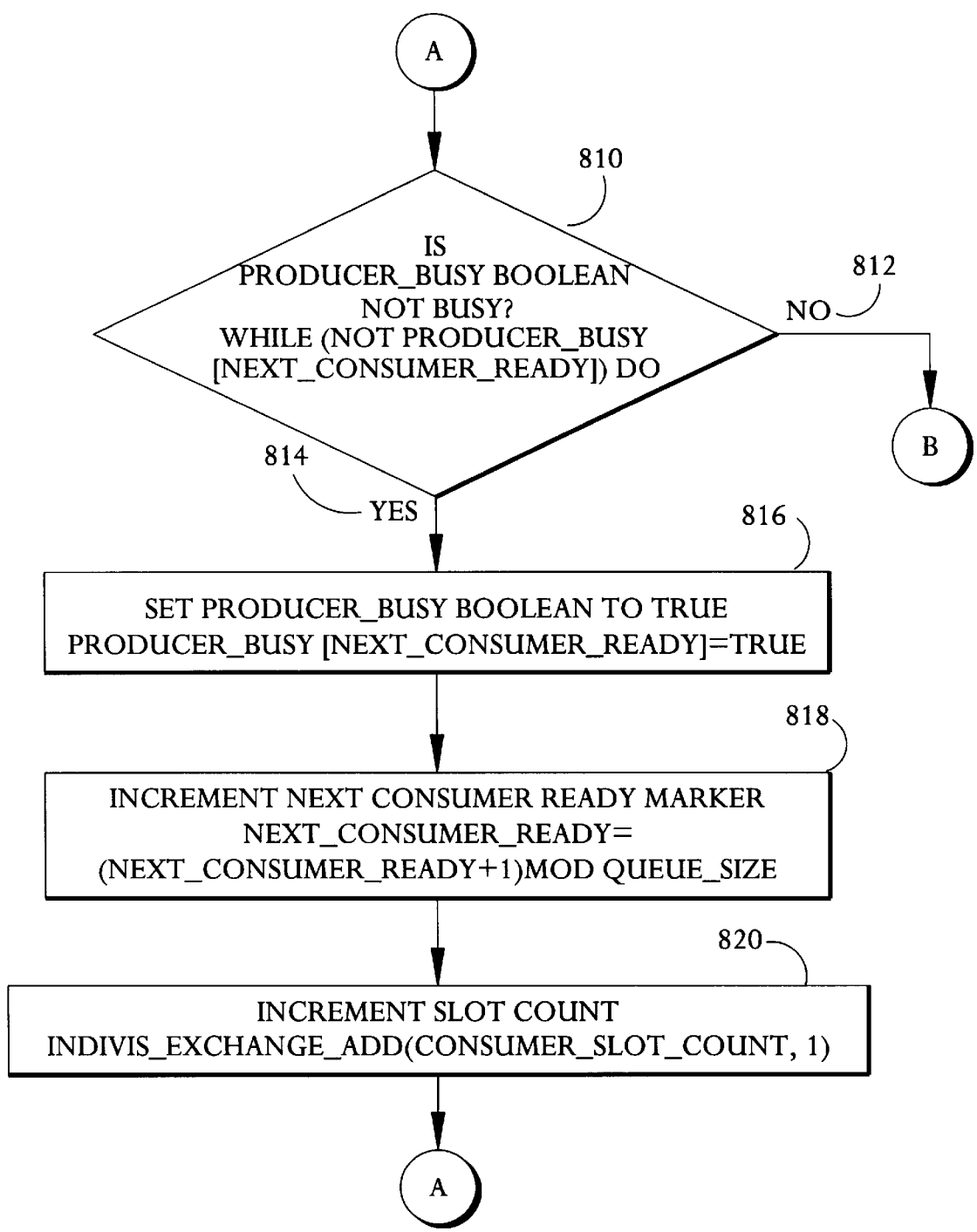

Referring now to FIGS. 7–9, the processing logic for making a slot available to the consumer (block 710) is illustrated. The third phase of the processing preferred by the present invention is making the slot with the resource available to the consumer. This part of the process guarantees that all "producer-busy" slots are eventually released to resource consumers, but that no such slots are released until the resource has been completely written. This step in the process uses two more key items of the present invention: 1) a mutual-exclusion token, and 2) an array of booleans corresponding to slots that indicate whether or not a producer is busy placing a resource in each slot. This is required due to the preemptive nature of systems for which this invention is targeted.

Consider a situation in which several producers have acquired slots before any of them has completed placing a resource in its slot. The order in which these producers finish placing their resources in their slots can be arbitrary. However, the order in which these resources may be consumed must be the order in which the slots themselves appear. Thus the "next-ready"marker must be only moved past contiguous ranges of slots where the states of "producer-busy" booleans indicate that resource placement has completed.

The normal state of a "producer-busy" boolean after initialization is "true". Thus, the moment a slot becomes "acquired", the slot is already flagged to indicate that a producer is in the process of placing a resource in the slot. When the producer finishes placing the resource, the producer marks its "producer-busy" boolean "false" (block 712). The producer must take care not to overwrite adjacent "producer-busy" booleans. For example it can avoid overwriting by representing these booleans as memory-granularity array elements or by using indivisible bit-manipulation instructions. An example of a queue fragment just after several producers have marked "producer-busy" booleans false is shown in FIG. 4. In FIG. 4, fully cross-hatched rectangles within the "producer-busy" section indicate slots where resource placement has completed.

In this example of FIG. 4, the two left-most slots 410 and 412 in the "producer-busy" section can be made ready for consumers. The next one 414 cannot, because it is still marked as busy. The rightmost slot 416 in the "producer-busy" section cannot be released even though its resource has been placed in the queue, because slot 416 has a "busy" slot somewhere before it. One additional key element of the present invention is the third phase process that updates the "producer-busy" booleans, the "next-ready" marker, and the count of slots available to the consumer, keeping them all consistent with one another.

Consistency is guaranteed by ensuring that one and only one producer updates these things. For brevity, the producer that does so may be called the "producer-completer". After a producer marks its "producer-busy" boolean to indicate that it has finished placing a resource in a slot (block 712 in FIG. 7), the producer "competes" to be the producer-completer (block 714). In the example above as illustrated in FIG. 4, the producers that just wrote the first 410, second 412, and fourth 416 slots from the left of the producer-busy section are the ones that compete as shown in FIG. 7.

The indivisible test-and-set instruction is used on the "producer-completer" mutual exclusion token to achieve this. The normal value of this token is "false". A producer uses indivisible test-and-set instruction to force the token to "true", also retrieving the old value as a side-effect. If the old value was "true" (block 716 in FIG. 7), then some other producer must have already acquired the token and no other action is required from this producer (processing path 718). A "success" indication is returned to the caller (block 720) and the processing logic is completed If the old value was "false" (block 716), then this producer is the "producer-completer" (path 722). The producer-completer examines the "producer-busy" booleans from the "next-ready" marker forward (block 810 shown in FIG. 8). As long as the producer completer finds a contiguous range of booleans marked to indicate that resource placement has completed (path 814), the producer-completer marks them one by one back to "true" (block 816), increments the "next-ready" marker (block 818), and indivisibly increments the count of slots available to consumers (block 820), stopping as soon as it encounters a slot marked as "still in-progress" (path 812). The producer-completer must use the indivisible exchange-add instruction to indivisibly increment the count of slots available to consumers (block 820) to ensure that its modification of the count does not violate the indivisibility of consumers' operations on the count. Indivisibly incrementing this count is the "other half" of communicating slot information from producer to consumer.

When the producer-completer examines a "producer-busy" boolean and finds that resource placement is still in progress for that slot (the third producer-busy slot 414 in FIG. 4), the producer-completer quits examining slots (path 812 in FIG. 8) and releases the producer-completer mutual exclusion token using the indivisible test-and-set instructions. This step in the process is shown in block 910 of FIG. 9. It is possible, however, that the producer for that slot marked the slot after the producer-completer examined the slot (block 810 in FIG. 8) but before the producer-completer got a chance to release the token (block 910 in FIG. 9). In addition, that producer may have already examined the token, found it set, concluded that some other agent was already the producer-completer, and exited (714, 716, 718, 720 in FIG. 7). To cover such a case, after the producer-completer releases the mutual-exclusion token (block 910 in FIG. 9) the producer-completer checks the next "producer-busy" boolean once more (block 912). If the boolean has been marked to indicate that resource placement has completed for that slot (path 916), the producer goes back through the "producer-completer sequence again, starting with competing for the mutual exclusion token (block 714 in FIG. 7).

There is an important point related to "modulo" arithmetic that must be considered when implementing this process on many processors. The indivisible exchange-add instruction may have no provision for "modulo" arithmetic to cause the circular buffer marker to "wrap around". The modulo operation would be a separate instruction outside the scope of the indivisible operation. However, an indivisible exchange-add instruction usually "wraps-around" at its natural maximum, e.g., $2^n$ where n is the number of bits used for the circular buffer marker. This gives the required result as long as the implementer obeys two rules: (1) the circular buffer size must be chosen to be an integral divisor of the buffer marker maximum, and (2) the value used as the index into the circular buffer is adjusted to wrap around on the buffer size boundary (i.e., "BufferMarker modulo BufferSize"). In addition, the implementer must allow for negative "count" values and use signed comparisons on count values to cover cases where multiple producers compete for slots when they are not available.

In the pseudo-code listings that follow, the variables "slots_for_producer", "my _marker", and "producer_ completer _running"are local variables. Each execution thread executing the algorithm gets its own distinct version of these variables. All other variables, and the circular buffer itself, are shared by all execution threads accessing the queue. Array indexes begin at zero. The pseudo-code of the "producer" process is shown. The "consumer" pseudo-code would be obtained by replacing each appearance of the string "producer" with "consumer" and each appearance of the string "consumer" with "producer".

The source code for implementing the preferred embodiment of the present invention is included below as appendix A.

```
*// phase 1: acquire a slot
slots_for_producer = Indivis_Exchange_Add(producer_slot_count, -1)
if (slots_for_producer <1) then
        Indivis_Exchange_Add(producer_slot_count, 1)
        return a "no slots available" error
endif
my_marker = Indivis_Exchange_Add(next_producer_slot, 1) mod queue_size
//phase 2: place resource in slot
place resource in circular buffer at my_marker (e.g., read or write)
//phase 3: make slot with resource available to consumer
producer_busy[my_marker] = false
<<do_producer_completer>> // a label we will go back to
producer_completer_running = Indivis_Test_And_Set
```

```
        (producer_completer_mutex, true)
if (producer_completer_running) then
        return with "success" indication // another producer is the completer
endif
while (not producer_busy[next_consumer_ready]) do
        producer_busy[next_consumer_ready] = true
        next_consumer_ready = (nex_consumer_ready + 1) mod queue_size
        Indivis_Exchange_Add(consumer_slot_count, 1)
end while
Indivis_Test_And_Set(producer_completer_mutex, false)
if (not producer_busy[next_consumer_ready]) then
        goto << do_producer_completer >>
endif
return with "success" indication
```

Pseudo-code of the "initialization" algorithm is as follows. This is done from the point of view that the queue is initially "empty" of the items that "producers" place in the queue.

```
// The "producer" side:
producer_slot_count = queue_size
next_producer_slot = 0
next_consumer_ready = 0
set all producer_busy = true
producer_completer_mutex = false
// The "consumer" side:
consumer_slot_count = 0
next_consumer_slot = 0
next_producer_ready = 0
set all consumer_busy = true
consumer_completer_mutex = false
```

This invention is useful in several broad classes of applications including, but not limited to, the following. First, it can be used wherever a thread of execution needs to pass information to another thread of execution with very low overhead. This situation arises in conventional operating systems, such as, Microsoft® Windows™, when one or more low-level drivers need to pass information to one or more higher-level applications. Such drivers typically operate in interrupt contexts. They may freely interrupt applications or one another. Algorithms must be low overhead to insure that interrupt processing is completed quickly. Interrupt contexts are also very restricted in what they are permitted to do, so avoiding operating system calls and limiting to "user" privilege are required.

Second, this invention can be used where there is a need to manage a fixed size "pool" of equivalent resources that are shared by a number of execution threads that have real-time, user-privilege requirements. An initialization step would "write" items into a queue to populate the pool. Thereafter, an agent would "read" from the queue to obtain a resource, and "write" to the queue to return the resource.

Thus, a multiple-reader multiple-writer queue is disclosed.

```
BOOL readQueue(
        lpmrw_queue   queue,
        LPVOID        item)
//
// This procedure reads a value from the queue, putting it
// into the location pointed to by "item". It returns TRUE
// iff the operation was successful.
{
    lpactual_queue lpq = AMPLIFY_QUEUE(queue);
    INT32 old_numitems;
    UINT32 take_index;
    // acquire a slot to read from
    old_numitems = (INT32) IndivisibleDec32 (& (lpq->readable_items));
      if (old_numitems < 1) {
          (void) IndivisibleInc32 (& (lpq->readable_items));
          return FALSE;
      }
    take_index = IndivisibleInc32(& (lpq->next_read)) %
          (lpq->queue_size);
    // read data from slot
    hmemcpy(
       (void _huge *)item,
       (void _huge *) & (lpq->queue_space[take_index * lpq->item_size]),
       (LONG) lpq->item_size);
    // mark slot as "completed"
    lpq->read_in_progress[take_index] = FALSE;
    // make contiguous "completed" slots available
    {
      BOOL completer_running;
      do_read_completion:
      completer_running = IndivisibleSet16 (
          & (lpq->read_completer_mutex),
          TRUE);
        if (! completer_running) {
```

```
            while (! (1pq->read_in_progress[1pq->next_read_completion])) {
                1pq->read_in_progress[1pq->next_read_completion] = TRUE;
                1pq->next_read_completion = (1pq->next_read_completion + 1)
                        % 1pq->queue_size;
                (void) IndivisibleInc32(& (1pq->writeable_slots));
            }
            (void) IndivisibleSet16(
                    & (1pq->read_completer_mutex),
                    FALSE);
            if (! (1pq->read_in_progress[1pq->next_read_completion])) {
                goto do_read_completion;
            }
        }
    }
    return TRUE;
}
BOOL writeQueue(
        1pmrw_queue    queue,
        LPVOID         item)
//
// This procedure writes a value from the location pointed
// to by "item" into the queue. It returns TRUE iff the
// operation was successful.
{
    1pactual_queue 1pq = AMPLIFY_QUEUE (queue);
    INT32 old_numslots;
    UINT32 give_index;
    // acquire a slot to write to
    old_numslots = (INT32) IndivisibleDec32(& (1pq->writeable_slots));
        if (old_numslots < 1) {
            (void) IndivisibleInc32(& (1pq->writeable_slots));
            return FALSE;
        }
    give_index = IndivisibleInc32(& (1pg->next_write)) %
            (1pq->queue_size);
    // write data to slot
    hmemcpy(
        (void _huge *) & (1pq->queue_space[give_index * 1pq->item_size]),
        (void _huge *) item,
        (LONG) 1pq->item_size);
    // mark slot as "completed"
    1pq->write_in_progress[give_index] = FALSE;
    // make contiguous "completed" slots available
    {
        BOOL completer_running;
        do_write_completion:
        completer_running = IndivisibleSet16(
                & (1pq->write_completer_mutex),
                TRUE);
        if (! completer_running) {
            while (! (1pq->write_in_progress [1pq->next_write_completion]))
            {
                1pq->write_in_progress[1pq->next_write_completion] = TRUE;
                1pq->next_write completion = (1pq->next_write_completion + 1)
                        % 1pq->queue_size;
                (void) IndivisibleInc32(& (1pq->readable_items));
            }
            (void) IndivisibleSet16(
                    & (1pq->write_completer_mutex),
                    FALSE);
            if (! (1pq->write_in_progress[1pq-->next_write_completion])) {
                goto do_write_completion;
            }
        }
    }
    return TRUE;
}
1pact->queue_size = actual_queue_items(queue_size);
1pact->readable_items = 0L;
1pact->writeable_slots = 1pact->queue_size;
1pact->item_size = item_size;
1pact->next_read = 0L;
1pact->next_read_completion = 0L;
1pact->next_write = 0L;
1pact->next write_completion = 0L;
1pact->read_completer_mutex = FALSE;
```

-continued

```
1pact->write_completer_mutex = FALSE;
...
for (i = 0L; i < 1pact->queue_size; i++) {
    1pact->read_in_progress[i] = TRUE;
}
...
for (i = 0L; i < 1pact->queue_size; i++) {
    1pact->write_in_progress[i] = TRUE;
}
```

We claim:

1. A multiple-reader, multiple-writer circular queue mechanism comprising:

a storage element including,
   a set of instructions and data for generating and maintaining a circular queue, said circular queue having,
   a) a plurality of slots for storage of resources.
   b) boundary markers marking boundaries in the circular queue dividing said circular queue into three different regions including,
      i) a first region with a next slot of said plurality of slots available for writing resources, said next slot not yet acquired for writing, boundaries for said region being marked by a next-available marker,
      ii) a second region with a next slot of said plurality of slots available for reading, said next slot not yet ready for reading, boundaries for said region being marked by a next-ready marker,
      ii) a third region in between said first and second regions with slots to which resources are in the process of being written in,
   c) a writing-available slot count for indicating the number of said plurality of slots available for writing, said writing-available slot count coupled to said next-available marker,
   d) a reading-available slot count for indicating the number of said plurality of slots available for reading, said reading-available slot count coupled to said next-ready marker, and
said set of instructions and data for acquiring said plurality of slots, said set of instructions and data executing an indivisible processor instruction for decrementing said writing-available slot count, and executing an indivisible processor instruction for incrementing said next-available marker, placing said resource in the slot indicated by said next-available marker, and making a slot with said resource available for reading, said slot indicated by said next-ready marker, and executing an indivisible processor instruction for modifying said consumer-available slot count, said set of instructions and data acquiring a mutual exclusion token, to limit access to said plurality of slots available for writing to only one source of writing said resources and
a processor coupled to said storage element, said processor executing said set of instructions and manipulating said data.

2. The multiple-reader, multiple-writer queue mechanism as claimed in claim 1 wherein said set of instructions and data executes an indivisible processor instruction.

3. The multiple-reader, multiple-writer queue mechanism as claimed in claim 1 wherein said slot acquired by said set of instructions and data is acquired by one and only one source of writing said resources.

4. The multiple-reader, multiple-writer queue mechanism as claimed in claim 1 further including a plurality of boolean values, a distinct boolean value of said plurality of boolean values associated with each slot of said plurality of slots, said distinct boolean value indicating if said slot is busy.

5. The multiple-reader, multiple-writer queue mechanism as claimed in claim 4 wherein said set of instructions and data examining said plurality of booleans starting from a slot indicated by said next-ready marker for a busy indication.

6. The multiple-reader, multiple-writer queue mechanism as claimed in claim 1 wherein said set of instructions and data releasing said mutual exclusion after modifying said next-ready marker.

7. The multiple-reader, multiple-writer queue mechanism as claimed in claim 1 further including a plurality of boolean values, a distinct boolean value of said plurality of boolean values being associated with each slot of said plurality of slots, said distinct boolean value indicating if said slot is busy, said multiple-reader, multiple-writer queue further including means for releasing said mutual exclusion token after modifying said next-ready marker, said distinct boolean value being examined after said means for releasing has released said mutual exclusion token.

8. A method for a multiple-reader, multiple-writer queue comprising the steps of:

indicating a first region with a next slot of said plurality of slots available for writing, but not yet acquired for writing, said indicating being performed by a next-available marker, said next-available marker placed between said first region and a third region having slots to which said resources are in the process of being written in;

indicating a second region with a next slot of said plurality of slots available for reading, but not yet made ready for reading, said indicating being performed by a next-ready marker, said next-ready marker placed between said third region with said slots to which said resources are in the process of being written in and said second region;

indicating the number of said plurality of slots available for writing;

indicating the number of said plurality of slots available for reading;

acquiring a slot for a resource, said resource in the slot indicated by said next-available marker; and making a slot with a resource available for reading, said slot indicated by said next-ready marker.

9. The method of claim 8 wherein said step of acquiring further comprises the steps of:

executing an indivisible processor instruction for decrementing said number of said plurality of slots that is available for use by a producer; and executing an indivisible processor instruction for incrementing the number of slot of a plurality of slots for storage of resources that is available for use by a producer.

10. The method of claim 9 further comprising the step of releasing said mutual exclusion after modifying said slot indicated as being available for use by a consumer.

11. The method of claim 8 wherein said step of making a slot with a resource available to a consumer further comprises the steps of:

acquiring a mutual exclusion token, said mutual exclusion token being held by one and only one producer; and executing an indivisible processor instruction for modifying said number of said plurality of slots that is available for use by a consumer.

12. The method of claim 11 wherein said step of acquiring a mutual exclusion token further comprises the step of executing an indivisible processor instruction.

13. The method of claim 9 wherein said slot is acquired by one and only one producer.

14. The method of claim 9 further comprises the step of including a plurality of boolean values, a distinct boolean value of said plurality of boolean values associated with each slot of said plurality of slots, said distinct boolean value indicating if said slot is busy.

15. The method of claim 14 further comprising the step of examining said plurality of booleans starting from said slot indicated as being available for use by a consumer.

16. The method of claim 8 further comprising the step of including a plurality of boolean values, a distinct boolean value of said plurality of boolean values being associated with each slot of said plurality of slots, said distinct boolean value indicating if said slot is busy, said multiple-reader, multiple-writer queue further including means for releasing said mutual exclusion token after modifying said slot indicated as being available for use by a consumer, said distinct boolean value being examined after said step of releasing has released said mutual exclusion token.

* * * * *